(12) United States Patent
Compton et al.

(10) Patent No.: US 11,342,759 B2
(45) Date of Patent: May 24, 2022

(54) POWER DISTRIBUTION NODE FOR A POWER ARCHITECTURE

(71) Applicant: GE Aviation Systems Limited, Gloucestershire (GB)

(72) Inventors: Russell Mark Compton, Droitwich Spa (GB); John Oliver Collins, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 207 days.

(21) Appl. No.: 15/888,429

(22) Filed: Feb. 5, 2018

(65) Prior Publication Data

US 2018/0233923 A1   Aug. 16, 2018

(51) Int. Cl.
| | |
|---|---|
| *H02J 4/00* | (2006.01) |
| *B64D 47/00* | (2006.01) |
| *B64D 41/00* | (2006.01) |
| *H02B 1/20* | (2006.01) |
| *H02J 7/14* | (2006.01) |
| *H02J 7/00* | (2006.01) |

(52) U.S. Cl.
CPC ............... *H02J 4/00* (2013.01); *B64D 41/00* (2013.01); *B64D 47/00* (2013.01); *H02B 1/20* (2013.01); *H02J 7/1423* (2013.01); *H02J 7/1438* (2013.01); *B64D 2221/00* (2013.01); *H02J 7/0068* (2013.01); *H02J 7/143* (2020.01); *H02J 2310/44* (2020.01); *Y02T 50/40* (2013.01); *Y02T 50/50* (2013.01)

(58) Field of Classification Search
CPC .... B64D 41/00; B64D 47/00; B64D 2221/00; H02B 1/20; H02J 4/00; H02J 7/1423; H02J 7/1438; H02J 2007/143; H02J 7/0068; H02J 2310/44; Y02T 50/44; Y02T 50/53
USPC ........................................................ 307/9.1
See application file for complete search history.

(56) References Cited

U.S. PATENT DOCUMENTS 6,281,602 B1 *   8/2001   Got ........................... H02J 1/10
                                                                  307/66
7,923,857 B2 *   4/2011   Langlois ................... H02J 1/08
                                                                  307/9.1

(Continued)

FOREIGN PATENT DOCUMENTS

| EP | 2 230 743 A2 | 9/2010 |
| GB | 2483696 A | 3/2012 |

(Continued)

OTHER PUBLICATIONS

Compton, R.M., et al., Power delivery system for multiple loads, GE co-pending Application No. 1702028.0, filed on Feb. 8, 2017.

(Continued)

*Primary Examiner* — Daniel Cavallari
*Assistant Examiner* — Brian K Baxter
(74) *Attorney, Agent, or Firm* — McGarry Bair PC

(57) ABSTRACT

A power distribution node for a power architecture, and method for operating, includes a microgenerator configured to generate a supply of electrical power, and a power distribution unit connected with a power supply bus and the microgenerator and configured to selectively energize at least a subset of electrical loads disposed proximately to the power distribution node. The energizing power is operably supplied by at least one of the power supply bus or the microgenerator.

18 Claims, 5 Drawing Sheets

(56) References Cited

U.S. PATENT DOCUMENTS

| | | | |
|---|---|---|---|
| 2005/0002140 A1* | 1/2005 | Borrego Bel | H02J 7/1423 361/62 |
| 2006/0061213 A1 | 3/2006 | Michalko | |
| 2008/0150356 A1 | 6/2008 | Breit et al. | |
| 2010/0019574 A1* | 1/2010 | Baldassarre | H02J 3/14 307/23 |
| 2010/0102625 A1* | 4/2010 | Karimi | B60L 1/00 307/9.1 |
| 2010/0204848 A1* | 8/2010 | Botura | B64D 15/12 700/295 |
| 2010/0231042 A1* | 9/2010 | Weale | H02J 4/00 307/38 |
| 2010/0282910 A1* | 11/2010 | Stothers | H02J 3/14 244/134 D |
| 2011/0077811 A1* | 3/2011 | Karimi | B60L 1/00 701/22 |
| 2012/0104847 A1 | 5/2012 | Roscoe et al. | |
| 2012/0233988 A1* | 9/2012 | Brunetti | F02K 1/82 60/320 |
| 2013/0099560 A1* | 4/2013 | Shipley | H02J 1/10 307/9.1 |
| 2015/0045976 A1* | 2/2015 | Li | H02J 4/00 700/295 |
| 2015/0060601 A1* | 3/2015 | Nakagawa | B64D 41/00 244/99.2 |
| 2015/0061378 A1* | 3/2015 | Nakagawa | H02J 1/08 307/9.1 |
| 2015/0097422 A1* | 4/2015 | Toothman | H02J 9/00 307/9.1 |
| 2015/0349687 A1 | 12/2015 | Liang et al. | |
| 2016/0036220 A1* | 2/2016 | Lacaux | H02M 3/04 307/9.1 |
| 2016/0107588 A1* | 4/2016 | White | H02J 3/06 307/9.1 |
| 2016/0122033 A1* | 5/2016 | Liffring | B64D 41/00 307/9.1 |
| 2016/0211673 A1* | 7/2016 | Krenz | H02J 3/381 |
| 2016/0280394 A1* | 9/2016 | Radun | H02J 1/10 |
| 2016/0359324 A1* | 12/2016 | Knowles | H02J 3/00 |
| 2017/0288453 A1* | 10/2017 | Hough | H02J 3/0073 |
| 2018/0138716 A1* | 5/2018 | Bailey | H02J 3/14 |
| 2018/0222411 A1* | 8/2018 | Aoki | B60L 1/00 |
| 2019/0267833 A1* | 8/2019 | Collins | H02J 4/00 |

FOREIGN PATENT DOCUMENTS

| | | |
|---|---|---|
| GB | 2510153 A | 7/2014 |
| GB | 2550381 A | 11/2017 |
| WO | 2016/195936 A1 | 12/2016 |
| WO | 2017/012650 A1 | 1/2017 |

OTHER PUBLICATIONS

Combined Search and Examination Report issued in connection with corresponding GB Application No. 1702455.5 dated Jul. 25, 2017.

* cited by examiner

POWER DISTRIBUTION NODE FOR A POWER ARCHITECTURE

BACKGROUND OF THE INVENTION

Electrical power systems, such as those found in an aircraft power distribution system, employ power generating systems or power sources, such as generators, for generating electricity for powering electrical loads, e.g., in the systems and subsystems of an aircraft. As the electricity traverses electrical bus bars and wiring to deliver power from power sources to electrical loads, power distribution nodes dispersed throughout the power system ensure that the power delivered to the electrical loads meets the designed power criteria for the loads. Power distribution nodes can, for instance, further provide step-up or step-down power conversion, direct current (DC) to alternating current (AC) power conversion or AC to DC power conversion, or switching operations to selectively enable or disable the delivery of power to particular electrical loads, depending on, for example, available power distribution supply, criticality of electrical load functionality, or aircraft mode of operation, such as take-off, cruise, or ground operations.

BRIEF DESCRIPTION OF THE INVENTION

In one aspect, the disclosure relates to a power distribution node for a power architecture, including a microgenerator configured to generate a supply of electrical power, and a distribution unit connected with a power supply bus and the microgenerator and configured to selectively energize at least a subset of electrical loads disposed proximately to the power distribution node from least one of the power supply bus or the microgenerator.

In another aspect, the disclosure relates to a power architecture for sets of electrical loads, including a power distribution bus, and a set of power distribution nodes disposed between the power distribution bus and corresponding sets of electrical loads. Each power distribution node includes a microgenerator configured to generate a supply of electrical power, and a distribution unit connected with the power distribution bus, and the microgenerator, and configured to selectively energize at least a subset of the corresponding electrical loads. Energizing power is distributed among the set of power distribution nodes, and operably supplied by at least one of the power distribution bus, or the microgenerator in at least a subset of power distribution nodes, and wherein each power distribution node is disposed proximate to a corresponding set of electrical loads.

In another aspect, the disclosure relates to a method of providing a supplemental supply of electrical power, including disposing a set of power distribution nodes about an electrical power architecture having a common power distribution bus, each power distribution node disposed proximate to a corresponding set of electrical loads and having at least one of a power storage device or a microgenerator configured to supply a transient power supply, and, in response to receiving in a controller module a supplemental power demand for the power distribution bus, controllably supplying a supplemental power supply from at least a subset of the power storage devices or at least a subset of the microgenerators to the power distribution bus

DESCRIPTION OF EMBODIMENTS OF THE INVENTION

Figure 1:
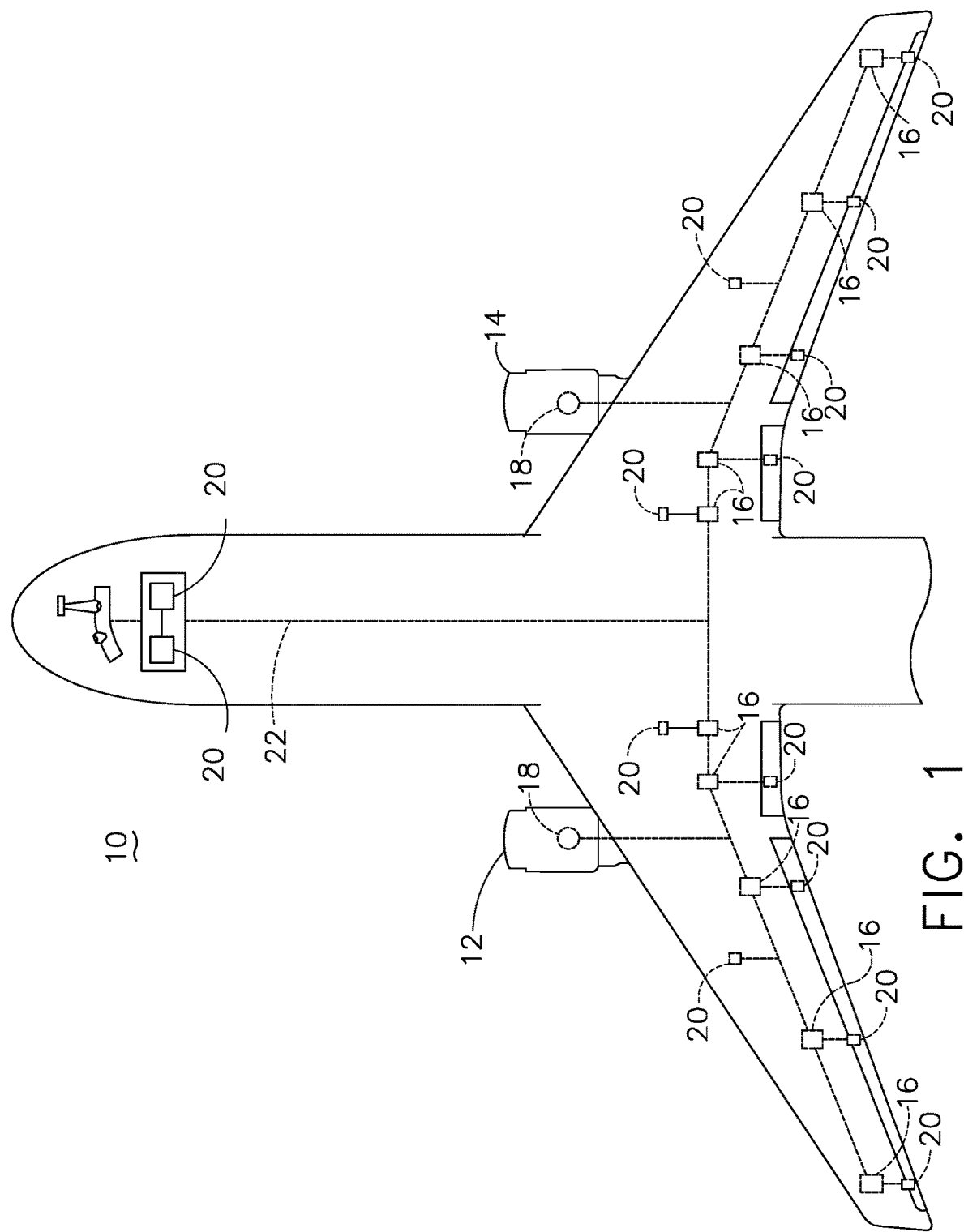
FIG. 1 is a top down schematic view of an aircraft and a power distribution system of the aircraft in accordance with various aspects described herein.

The described aspects of the disclosure of the present disclosure are directed to a method and apparatus associated with a power distribution node. One example environment where such a method and apparatus can be used includes, but is not limited to, a power distribution system for an aircraft. While this description is primarily directed toward a power distribution system for an aircraft, it is also applicable to any environment using a nodal-based power distribution system where input power is received, acted upon (if necessary), e.g., converted or modified, and distributed to one or more electrical loads.

While "a set of" various elements will be described, it will be understood that "a set" can include any number of the respective elements, including only one element. The use of the terms "proximal," "proximate," "proximally," "local," "locally," or "localized" refers to physical disbursement of a given element or object near to, nearby, or relatively closer to the reference element or object, as compared to another component.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. The exemplary drawings are for purposes of illustration only and the dimensions, positions, order and relative sizes reflected in the drawings attached hereto can vary.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as an electric machine or a generator 18. The aircraft is shown further having a set of power-consuming components, or electrical loads 20, such as for instance, an actuator load, flight critical loads, and non-flight critical loads. The electrical loads 20 are electrically coupled with at least one of the generators 18 via a power distribution system including, for instance, power transmission lines 22 or bus bars, and power distribution nodes 16. It will be understood that the illustrated aspects of the disclosure of FIG. 1 is only one non-limiting example of a power distribution system, and many other possible aspects of the disclosure and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the generator 18. The generator 18, in turn, generates power, such as AC or DC power, and provides the generated power to the transmission lines 22, which delivers the power to the power distribution nodes 16, positioned throughout the aircraft 10. The power distribution nodes 16 receive the AC or DC power via the transmission lines 22, and can provide switching, power conversion, or distribution management functions, as needed, in order to provide the desired electrical power to the electrical loads 20 for load operations.

Example power distribution management functions can include, but are not limited to, selectively enabling or disabling the delivery of power to particular electrical loads 20, depending on, for example, available power distribution supply, criticality of electrical load 20 functionality, the state of health of the electrical system or loads, or aircraft mode of operation, such as take-off, cruise, or ground operations. Additional management functions can be included. Furthermore, additional power sources for providing power to the electrical loads 20, such as emergency power sources, ram air turbine systems, starter/generators, or batteries, can be included, and can substitute for the power source. It will be understood that while aspects of the disclosure are shown in an aircraft environment, the disclosure is not so limited and has general application to electrical power systems in non-aircraft applications, such as other mobile applications and non-mobile industrial, commercial, and residential applications.

Figure 2:
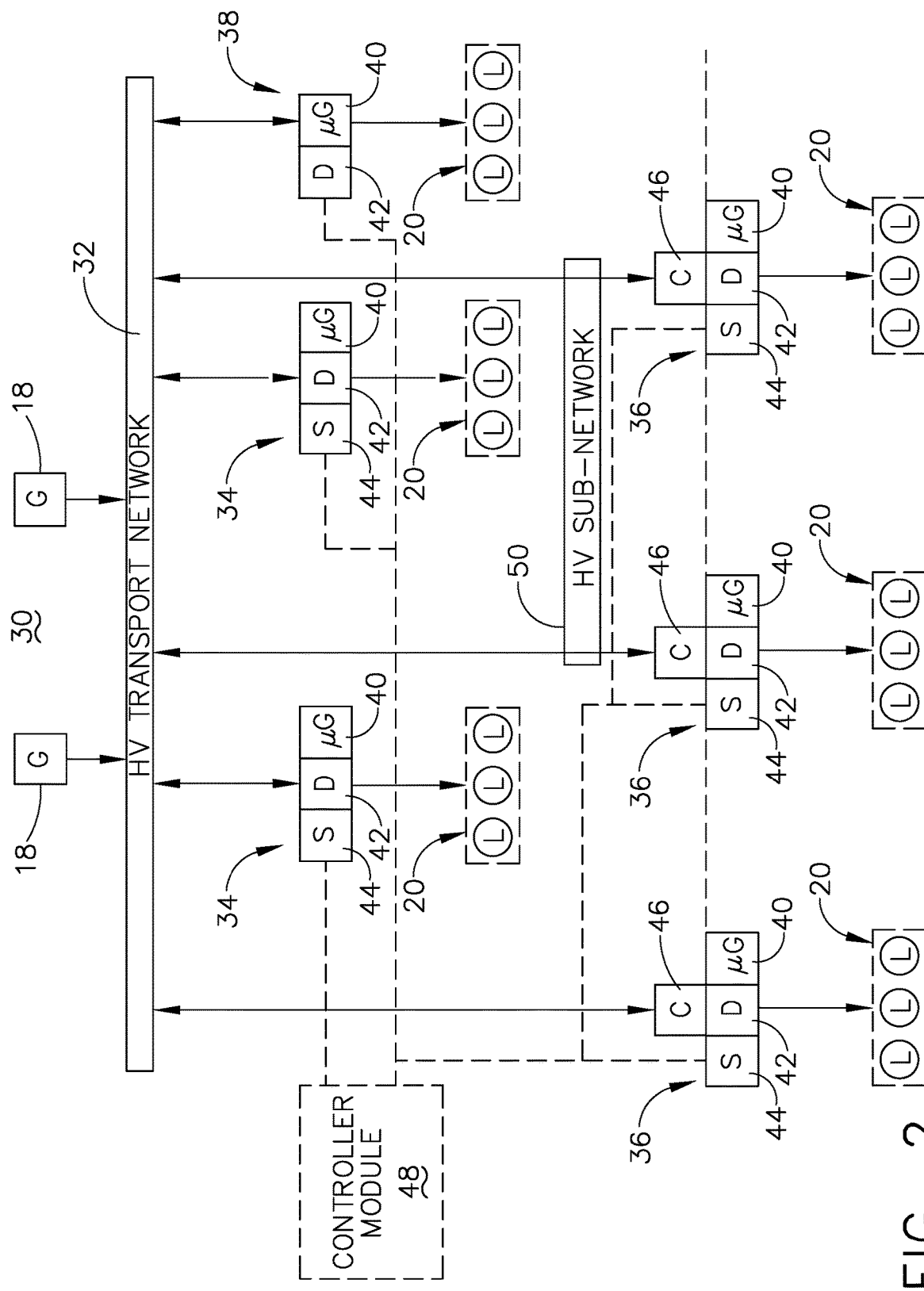
FIG. 2 is a schematic view of the electrical system architecture as may be used in the aircraft of FIG. 1, in accordance with various aspects described herein.

FIG. 2 illustrates one non-limiting schematic block diagram of a power distribution architecture 30 as may be used in the aircraft 10 in accordance with various aspects described herein. The power distribution architecture 30 is shown including the multiple generator systems 18, such as from the engine systems 12, 14. Non-limiting aspects of the disclosure can be included wherein at least one generator 18 can include a starter/generator, that is, a generator that is capable or enabled to provide a starting function for an operably coupled engine system 12, 14 when supplied with a starting power. Specific methods or configurations of starter/generators are not germane to the aspects of the disclosure. Non-limiting configurations can be envisioned wherein at least one generator 18 per engine system 12, 14 is a starter/generator. Additionally, non-limiting aspects of the disclosure can be applied regardless of whether the generator 18 is configured to generate alternating current (AC) power or direct current (DC) power.

The set of generators 18 are shown in parallel arrangement and configured to provide respective generator power outputs to a high voltage transport network 32, such as a primary power supply bus, a secondary power supply bus, transmission lines, or the like. The set of generators 18 can be, for instance, selectively connected with the high voltage transport network 32 by way of respective selectively coupling links. Non-limiting aspects of the disclosure can be included wherein the set of generators 18 generate electrical power (AC or DC power), to a common power supply for the high voltage transport network 32. In one example, the common power supply can include 270 volts DC, plus or minus 270 volts DC, plus and minus 270 volts DC, 115 volts AC at 400 Hertz, or 230 volts AC at 400 Hertz. Additional common power supplies can be included.

The high voltage transport network 32 can be further selectively connected, by way of respective selectively coupling links, to a set of power distribution nodes, illustrated as a first subset of power distribution nodes 34, a second subset of power distribution nodes 36, and a third power distribution node 38. At least a subset of the power distribution nodes 34, 36, 38 can be selectively connected, by way of respective selectively coupling links to, to a respective set of electrical loads 20. The power distribution nodes can comprise at least a subset of the following modular components: a microgenerator node 40 (illustrated as "µG"), a distribution unit 42 (illustrated as "D"), a power storage device or node 44 (illustrated as "S"), and a converter node 46 (illustrated as "C"). In one non-limiting aspect of the disclosure, the microgenerator node 40 can include a device configured to generate or supply an amount of electrical power to the power distribution node 34, 36, 38, the high voltage transport network 32, or a combination thereof.

Non-limiting examples of the microgenerator node 40 can include, but are not limited to, a photovoltaic panel, a turbine, a thermal energy harvester, fuel cell, or a supplemental generator. As used herein, "micro" is provided with reference to the primary power supplies, such as the set of generators 18. In this sense, the microgenerator node 40 can provide a supply of electrical power to the power distribution node 34, 36, 38 to operably supply power or supplement an electrical demand. Aspects of the disclosure can be selected or configured with microgenerator nodes 40 adapted for power generation or supply based on a locally available energy source, relative to the power distribution node 34, 36, 38. In one example, a power distribution node 34, 36, 38 or microgenerator node 40 located at, on, or near a surface exposed to light can include a photovoltaic panel, while another power distribution node 34, 36, 38 or microgenerator node 40 located at, on, or near an engine can include a thermal energy harvester, a turbine, or a combination thereof. In one non-limiting example, the microgenerator node 40 can be configured, sized, selected, or the like to provide a predetermined amount of power sufficient for a respective electrical demand.

In another non-limiting example of the disclosure, the power storage node 44 can include a device configured or capable of storing energy, such as electrical energy, for subsequent distribution or supplying. Non-limiting examples of power storage nodes 44 can include, but are not limited to, a battery, a rechargeable battery, a bank or rechargeable or non-rechargeable batteries, a thermal battery such as a molten salt batter, a super capacitor, a fuel cell, the like, or a combination thereof. In one non-limiting example, a thermal battery can store thermal energy, which can be supplied to a thermal energy harvester microgenerator node 40. In one non-limiting example, the power storage node 44 can be configured, sized, selected, or the like to provide or store a predetermined amount of power or energy sufficient for a respective electrical demand or microgenerator node 40 demand. In non-limiting examples wherein the power storage node 44 is rechargeable, the power storage node 44 can be operably recharged by energy or excess energy supplied by at least one of the microgenerator node 40, the high voltage transport network 32, another power bus, or the like.

The distribution unit 42 can be connected with the microgenerator node 40, the power storage node 44, the high voltage transport network 32, the converter node 46, or a combination thereof, and provide to selective energization, switching, or energizing of the subset of electrical loads 20 connected with the respective power distribution node 34, 36, 38. In one non-limiting example configuration, the distribution unit 42 can include a solid state switching device. In another non-limiting example configuration or classification, the electrical loads 20 or a subset thereof, the one or more distribution units or nodes 42 can selectively enable or disable the powering or energizing of the electrical loads, including non-critical electrical loads. In another non-limiting example configuration or classification of the electrical loads 20, the distribution units 42 can selectively enable or disable the powering or energizing of essential, or flight-critical loads 20. As used herein "non-critical" electrical loads 20 can include in-flight entertainment, galley functions, or the like, while "flight-critical" electrical loads 20 can include flight management system, electrical flight actuators, or the like.

Non-limiting examples of the power distribution architecture 30 can be included wherein a set or subset of electrical loads 20 disposed relative to a particular power distribution node 34, 36, 38 includes critical and non-critical electrical loads 20. Operation of the distribution unit 42 can be controllably actuated by way of a power distribution controller, illustrated as a controller module 48, that is communicatively connected with the set of power distribution nodes 34, 36, 38. In one non-limiting example, the controller module 48 can be configured to control the selective energizing of the subset of electrical loads 20 by way of the respective distribution units 42, based on available supplies of electrical power from, for instance, at least a subset of the high voltage transport network 32, a localized power storage node 44, or a localized microgenerator 40.

In one non-limiting example of the disclosure, the controller module 48 can operate in response to a desired or demanded power for the power architecture, or a set or subset of electrical loads. The desired or demanded power can be determined by manual input, an executable computer program, an expected operating characteristics of the gas turbine engines, the aircraft, a referenced from known data such as a lookup table, or the like. The computer program can include a computer program product that can include machine-readable media for carrying or having machine-executable instructions or data structures stored thereon. Such machine-readable media can be any available media, which can be accessed by a general purpose or special purpose computer or other machine with a controller. Generally, such a computer program can include routines, programs, objects, components, data structures, and the like, that have the technical effect of performing particular tasks or implement particular abstract data types. Machine-executable instructions, associated data structures, and programs represent examples of program code for executing the exchange of information as disclosed herein. Machine-executable instructions can include, for example, instructions and data, which cause a general purpose computer, special purpose computer, or special purpose processing machine to perform a certain function or group of functions. Aspects of the disclosure are envisioned wherein the controller module is configured for executing such computer programs, and can additionally receive the operational data from a controllable component, a control loop feedback mechanism, or from an external signal generated by, for example, the left or right engines, the aircraft, the set of the generators 18, or another power system in the electrical network.

The converter nodes 46 can be disposed between the high voltage transport network 32 and the distribution unit 42 of the respective power distribution node 34, 36, 38, and can operate as an inverter/converter, or the like. As described herein, an inverter/converter can be configured to operably enable or selectively implement inverting, converting, controlling, or the like, a first power received by a first input/output of the converter node 46 to a second power supplied by a second input/output of the converter node 46. In this sense, the converter node 46 can operably convert a first power to a different second power. Converting can include, but is not limited to, altering an AC frequency, stepping up or stepping down an AC or DC voltage, AC-to-DC power conversion, DC-to-AC power conversion, or the like. Additionally, non-limiting aspects of the disclosure can be included wherein at least one converter node 46 can be configured to provide bi-directional or uni-directional power converting. In this sense, at least one converter node 46 can be included that can controllably or operably convert power supplied by at least one of the microgenerator 40 or the power storage node 44 to the high voltage transport network 32, as well as controllably or operably convert power supplied by the high voltage transport network 32 to at least a subset of the respective electrical loads 20. In this example, the converter nodes 46 can operably provide converting or inverting to match a predetermined or existing power supply characteristic of the output power, such as a voltage or frequency characteristic. In another non-limiting example of the disclosure, the converter nodes 46 can operably supply power for recharging a rechargeable power storage node 44.

In another non-limiting example aspect of the disclosure, a first group of electrical loads 20 connected with a power distribution node 34, 36, 38 can be operably energized by a first output power, while a different group of electrical loads 20 connected with a different power distribution node 34, 36, 38 can be operably energized by a second power, different from the first output power. This modular system configuration allows for or enables for a predetermined power distribution node 34, 36, 38 to include a predetermined or preselected converter node 46 configured to operate a specific set of electrical loads at a predetermined set of electrical characteristics. Alternatively, as seen at the first and third power distribution nodes 34, no converter node 46 need be utilized when a set or subset of electrical loads 20 operates at the electrical characteristics of the high voltage transport network 32. Thus, the power distribution architecture 30 allows for or enables a set of working voltages tailored or configured to operate or energize a corresponding set of electrical loads 20. While a number of working voltages are described, any number of converter nodes 46, power distribution nodes 34, 36, 38, or working voltages based on electrical demands of the electrical loads 20, can be included.

During transient moments where the set of generators 18 or high voltage transport network 32 cannot provide or supply the desired, demanded, or allocated power requested for the set of electrical loads 20, at least one of the power supply nodes 44 or the microgenerator nodes 40 can supply or supplement an amount, or at least a portion, of power to meet the electrical demands of the power system architecture 30, or at least a subset of the electrical loads 20. One non-limiting example of a transient moment can include a moment of peak current or inrush current drawn by the selective energizing of at least a subset of electrical loads 20.

Another non-limiting example of a transient moment can include providing a starting power for starting a starter/generator, an auxiliary power unit, powering an emergency power distribution bus, or the like.

Aspects of the disclosure can be included wherein a power distribution node 34, 36, 38 is disposed proximate to the respectively energizable set of electrical loads 20. In this sense, the high voltage transport network 32 can be distributed throughout the power distribution architecture or aircraft, and locally relative to a set of electrical loads 20, the power distribution nodes 34, 36, 38 can operably provide or allow power conversion (by way of the converter nodes 46, if needed) and distribution or switching functions (by way of the distribution units 42) to the local set of electrical loads 20. Additionally, localized power generation (by way of the microgenerator nodes 40) and energy storage (by way of the power storage nodes 44) can be provided to locally supplement or entirely power an energy demand of the respective set of electrical loads 20.

Aspects of the disclosure can be included wherein a subset of the power distribution nodes 34, 36, 38 can be interconnected by way of a different power bus, illustrated as a high voltage sub-network 50. In this sense, a set of sub-networks 50 can be included to provide power distribution architecture 30 redundancy, or emergency power buses, as designed.

In a first aspect of the disclosure, the first set of power distribution nodes 34 can include a microgenerator node 40, a distribution unit 42, and a power storage node 44, or a subset thereof, and no converter node 46. In this example, the electrical loads 20 selectively connected with the first power distribution node 34, the power storage node 44, and the microgenerator node 40 can all operate at the same power characteristics as the high voltage transport network 32. In another aspect of the disclosure, the second power distribution nodes 36 can include a microgenerator node 40, a distribution unit 42, a power storage node 44, and a converter node 46. In this example, the electrical loads selectively connected with the first power distribution node 34, the power storage node 44, and the microgenerator node 40 can all operate at a different set of power characteristics than the high voltage transport network 32, which is converted by the converter node 46. Aspects of the disclosure can be included wherein the microgenerator node 40 and the power storage node 44 can operate at different electrical characteristics than the set of electrical loads 20.

In yet another aspect of the disclosure, the third power distribution node 38 can include a distribution unit 42 and a microgenerator node 40 and no converter node 46 or power storage node 44. The third power distribution node 38 can be, in one non-limiting example, configured to selectively energize a large system, or a larger power-consuming system, including but not limited to an environmental control system. In one example, the size or storage capacity of a power storage node 44 would be too large to adequately power or supplement the larger power-consuming system. In another example, the location proximate to the larger power-consuming system might not be able to physically house or support a power storage node 44 due to, for example, spatial or weight limitations.

The high voltage transport network 32 or the high voltage sub-network 50 can be further connected by way of a set of selectively coupling links to a set of additional electrical loads or electrical buses utilized to selectively supply power to the set of electrical loads (not shown). For instance, one non-limiting example configuration can include one or more power distribution architectures 30 operating as a left main bus, a right main bus, one or more critical load buses, or the like, with various configured redundancies. The set of power distribution architectures 30, buses, or the like, can be arranged, categorized, organized, or selectively supplied by electrical power based upon an assignment to a respective engine system 12, 14 (e.g. left or right), or a classification of electrical loads (e.g. main bus loads, essential or critical bus loads, etc.).

Figure 3:
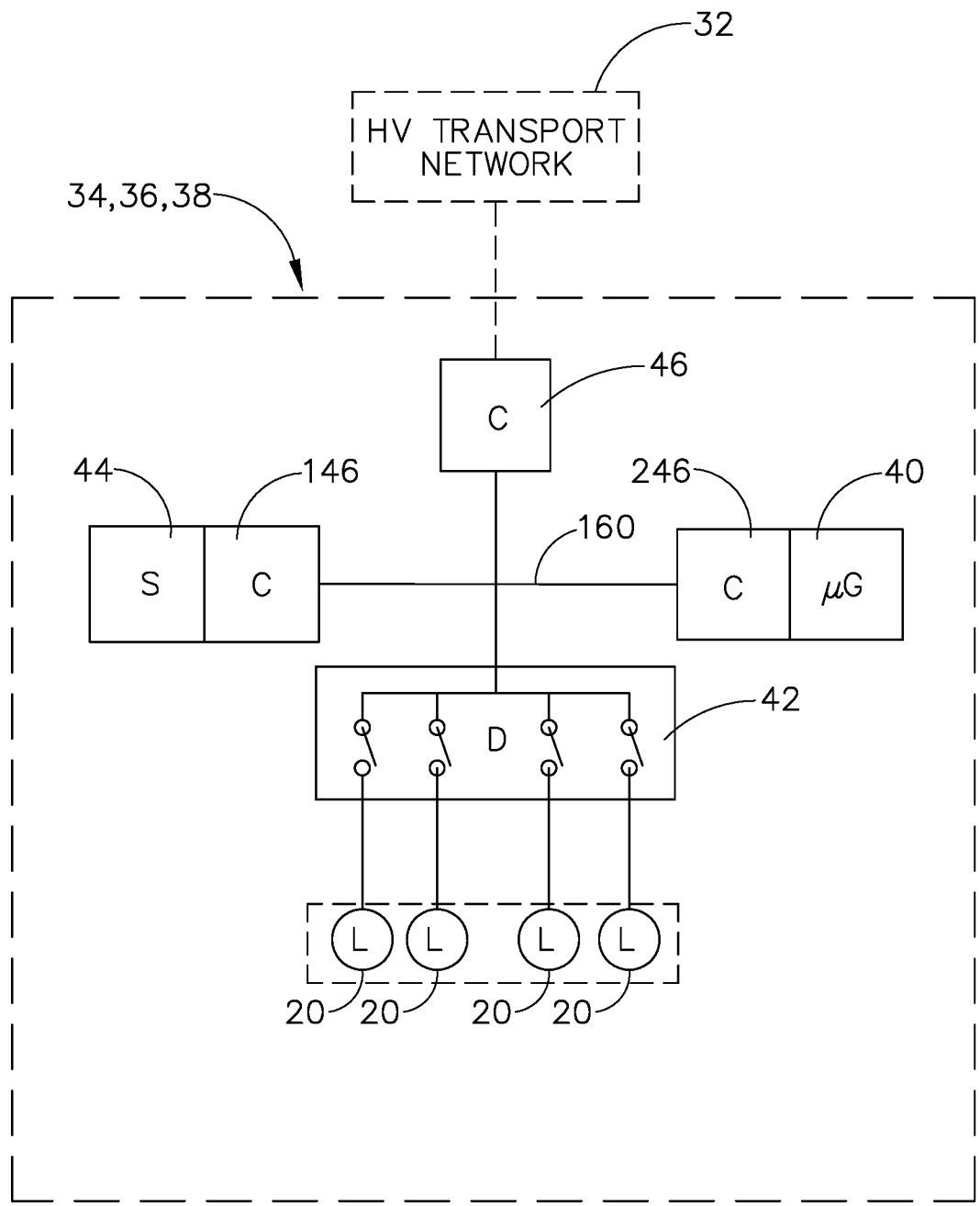
FIG. 3 is a schematic view of a power distribution node electrical system architecture of FIG. 2 in accordance with various aspects described herein.

FIG. 3 illustrates a schematic view of one example of the power distribution nodes 34, 36, 38, in accordance with aspects described herein. As shown, the power distribution nodes 34, 36, 38 can further include a set of converter nodes 46, 146, 246 associated with different aspects of the power distribution nodes 34, 36, 38. In one non-limiting example configuration, a first converter node 46 can be associated with the connection with the high voltage transport network 32 and configured to convert (or the like) the high voltage power characteristics to power characteristics tailored, suited, selected, or the like, for the set of electrical loads 20, and supplied to the distribution unit 42 by conductive interconnects 160. In another non-limiting example configuration, a second converter node 146 can be associated with the power storage node 44 and configured to convert (or the like) the power characteristics between the electrical interconnects 160 and the power storage node 44, for instance, when the electrical power characteristics of the electrical interconnects 160 or the electrical loads 20 are dissimilar to the power storage node 44. In yet another non-limiting example configuration a third converter node 246 can be associated with the microgenerator 40 and configured to convert (or the like) the power characteristics from the microgenerator 40 to the electrical interconnects 160, for instance, when the electrical power characteristics of the power supply generated by the microgenerator 40 is dissimilar to the electrical power characteristics of the electrical interconnects 160 of the electrical loads 20. In this sense, a set of converter nodes 46, 146, 246 can be included in a set or subset of the power distribution nodes 34, 36, 38, and independently configured to operate a subset of the nodes 40, 44, for instance, in response to a power demand signal or a control signal from the controller module 48.

While the aforementioned aspects of the disclosure contemplate a converter node 146 connected with the power storage node 44, non-limiting configurations of the disclosure can be included wherein the power storage node 44 are directly connected with one or more interconnects 160 when the power storage node 44 operates at a voltage or power characteristics of the interconnects 160 (e.g. and doesn't require power conversion for distribution, for example). Similarly, aspects of the disclosure can be included wherein the microgenerator 40 can be directly connected with one or more interconnects 160 when the microgenerator 40 generates a voltage or power characteristics of the interconnects 160 (e.g. and doesn't require power conversion for distribution, for example).

Figure 4:
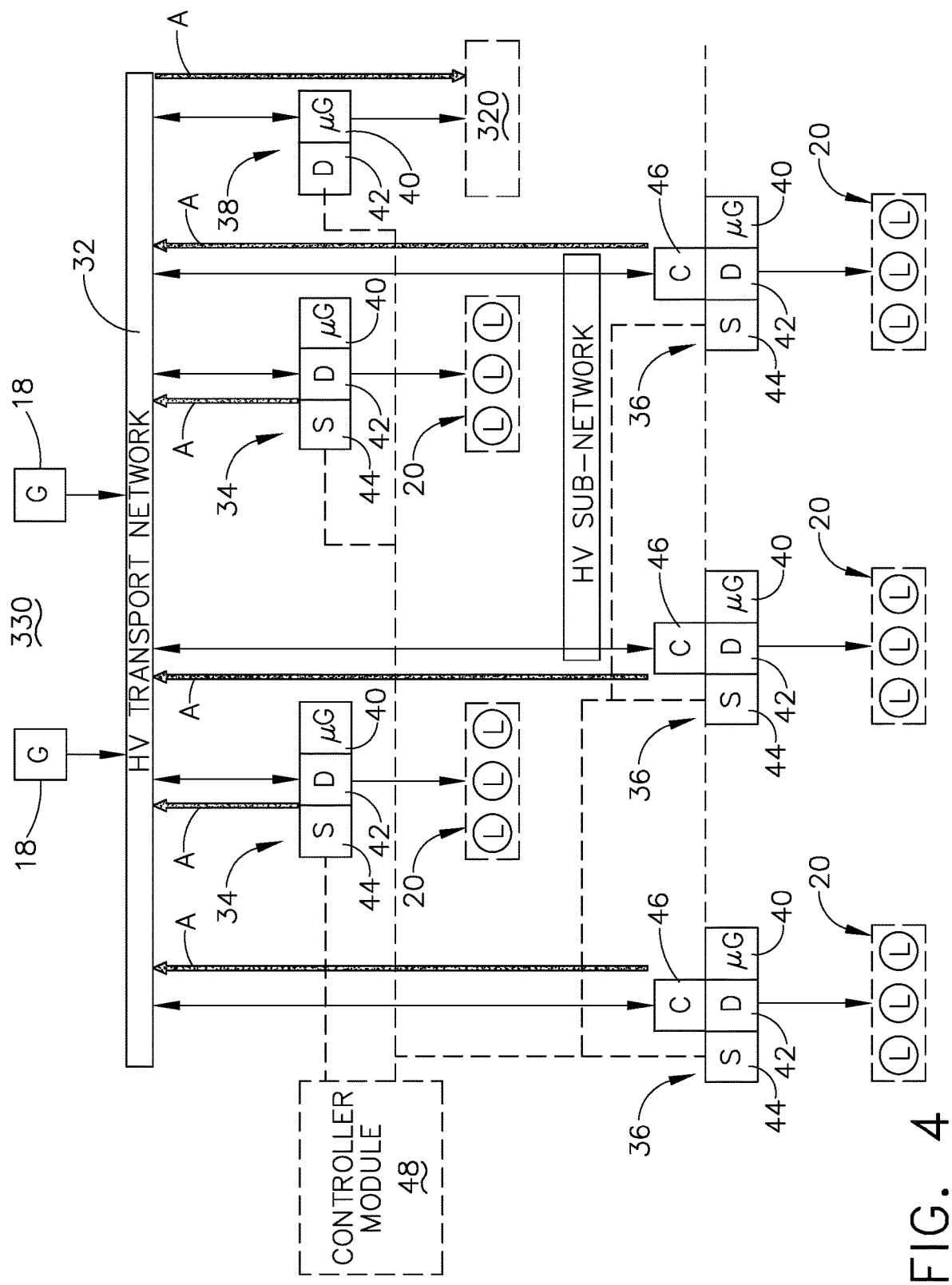
FIG. 4 is a schematic view of a mode of supplying supplemental power to the electrical system architecture of FIG. 2, in accordance with various aspects described herein.

FIG. 4 illustrates an example operation of the power system architecture 330 in accordance with aspects of the disclosure. In the illustrated example, the power system architecture 330 can utilize the distributed microgenerators 40 and power storage nodes 44 of the power distribution nodes 34, 36 to convert (if needed) and supply independent and individual power to a common power bus, such as the high voltage transport network 32 or high voltage sub-network 50, in order to provide a collectively large amount of power demanded. For example, in one aspect of the disclosure illustrated, arrows (labeled "A" in FIG. 4) indicating power supply are provided to the high voltage transport network 32 from at least a subset of the distributed power distribution nodes 34, 36 to commonly supply a starting power to an auxiliary power unit 320, by way of the third power distribution node 38. In this sense, the set or subset of the distributed power distribution nodes 34, 36 can be supplementing the power generated by the generators 18 and supplied to the high voltage transport network 32 for a transient power demand such as a large electrical load starting or coming on-line. Additional non-limiting examples of transient large electrical loads can include starting or restarting a starter/generator, operating the environmental control system, powering an emergency power bus, or any other transient power demands supplied by at least two power distribution node 34, 36 power sources, such as the microgenerator 40 or the power storage node 44.

Figure 5:
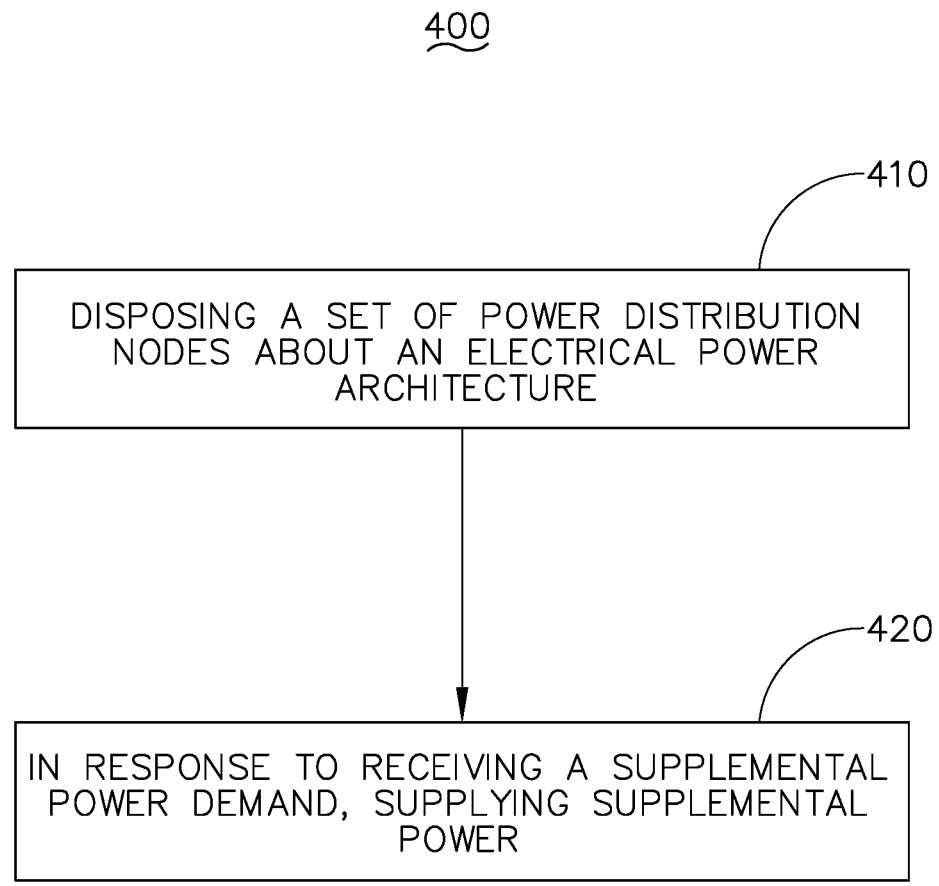
FIG. 5 is an example a flow chart diagram demonstrating a method of providing a supplemental supply of electrical power in accordance with various aspects described herein.

FIG. 5 illustrates a flow chart demonstrating one non-limiting method 400 for providing a supplemental supply of electrical power. The method 400 begins by disposing a set of power distribution nodes 34, 36, 38 about an electrical power architecture 30, 330 having a common power distribution bus such as the high voltage transport network 32, each power distribution node 34, 36, 38 disposed proximate to a corresponding set of electrical loads 20 and having at least one of a power storage device 44 or a microgenerator 40 configured to supply a transient power supply, at 410. In response to receiving in a controller module 48 a supplemental power demand for the power distribution bus, the method 400 continues by controllably supplying a supplemental power supply from at least a subset of the power storage devices 44 or at least a subset of the microgenerators 40 to the power distribution bus, at 420.

In one non-limiting example, the method 400 disposing step can further includes configuring the at least one of the power storage device 44 or the microgenerator 40 to supply a transient power supply sized to supply at least a portion of transient power demands for the corresponding set of electrical loads 20. In another non-limiting example, the method 400 can include controllably supplying a collective supplemental power supply from the at least a subset of the power storage devices 44 configured for starting an engine, starting an auxiliary power unit 320, or for powering an emergency power distribution bus.

The sequences depicted are for illustrative purposes only and are not meant to limit the method 400 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. Aspects of the disclosure provide a robust power distribution architecture for powering electrical loads in an electrical system. The technical effect is that the above described aspects enable supplying of power, or the supplying of supplemental power during transient periods in response to a power demand signal.

One advantage that may be realized in the above described aspects is that the above described aspects provide a decentralized power architecture wherein individual power distribution nodes can be located proximate to the electrical loads they supply or operate. The localization of the power distribution nodes can result in optimized electrical converting components based on the subset of energized electrical loads and expected characteristics, and thus, can optimize weight, cooling, electrical distribution needs, and redundancies as needed, without overbuilding the architecture. Additionally, the use of the high voltage transport network through the distribution of the architecture and limiting the power distribution nodes proximate to the electrical loads minimizes wiring weight of the architecture.

The architecture presented differs markedly in the physical arrangement. A high-voltage transport network supplies power to nodes distributed around the aircraft. Each node may encompass distribution, conversion, storage and micro-generation elements, which feed local load groups. Additionally, dedicated transport sub-networks can be included in the architecture to provide additional redundancy between key nodes, rather than solely through tying of major power buses. The set of power distribution nodes can each be configured based on the electrical loads so that the architecture has a corresponding set of operating voltages or electrical characteristics. In contrast to traditional architectures that possess a limited number of operating voltages (i.e. two or three), the aforementioned disclosure allows an arbitrary number of operating voltages at the power nodes, optimized for the local load groups.

Yet another advantage of the above-described aspects is that energy storage and energy generation can be distributed around the network, aircraft, or architecture, and configured to nominally supplying local loads (emergency power, ground power, fill-in etc.). The collaboration of these power distribution nodes to support high power loads or transient modes of high-power draw operation further advances the disclosure. For example, the starting of an auxiliary power unit will utilize the combined energy of many power distribution nodes (e.g. pool the distributed energy supplies), by way of one or more power buses or transport networks. Additionally, the distribution (i.e. decentralization) of the power storage nodes and microgenerators allows for increased reliability of the power architecture, as it prevents a single point of failure for any given power storage unit or generator.

Yet another advantage of the above-described disclosure increases fault tolerance. Another advantage is utilizing microgenerators capable of utilizing additional power sources (thermal, solar, etc.) beyond traditional electric machines.

When designing aircraft components, important factors to address are size, weight, and reliability. The above described electrical starting system has a decreased number of parts, yet provides redundant starting operation, making the complete system inherently more reliable. This results in a lower weight, smaller sized, and increased reliability system. The lower number of parts and reduced maintenance will lead to lower product costs and lower operating costs. Reduced weight and size correlate to competitive advantages during flight.

To the extent not already described, the different features and structures of the various aspects of the disclosure may be used in combination with each other as desired. That one feature may not be illustrated in all of the aspects of the disclosure is not meant to be construed that it may not be, but is done for brevity of description. Thus, the various features of the different aspects of the disclosure may be mixed and matched as desired to form new aspects of the disclosure, whether or not the new aspects of the disclosure are expressly described. All combinations or permutations of features described herein are covered by this disclosure.

This written description uses examples to disclose the disclosure, including the best mode, and also to enable any person skilled in the art to practice the aspects of the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution node for a power architecture, comprising:
   a microgenerator comprising at least one of a photovoltaic panel, a turbine, a thermal energy harvester, a fuel cell, or a supplemental generator, the microgenerator configured to generate a supply of electrical power;
   a distribution unit associated with the microgenerator connected with a power supply bus to receive power therefrom and further connected with the microgenerator to receive power therefrom, the distribution unit configured to selectively provide power to at least a subset of electrical loads disposed proximately to the power distribution node, from a selected one of the power supply bus and the microgenerator, the distribution unit further configured to selectively provide power from the microgenerator to the power supply bus; and
   a controller module configured to control the selective providing power to the subset of electrical loads by way of the distribution unit, based on available supplies of electrical power and a criticality of the at least the subset of the electrical loads.

2. The power distribution node of claim 1, further including a power storage device wherein the power storage device includes at least one of a battery, a rechargeable battery, a molten salt battery, a super capacitor, or a fuel cell.

3. The power distribution node of claim 2, wherein the power provided to at least the subset of electrical loads is operably supplied by at least one of the power supply bus, the microgenerator, or the power storage device.

4. The power distribution node of claim 2, wherein the power provided to at least the subset of electrical loads is operably supplied by at least two of the power supply bus, the microgenerator, or the power storage device.

5. The power distribution node of claim 2, further including a power converter module configured to convert a first power received from at least one of the microgenerator, the power storage device, or the power supply bus to a second power supplied to the at least the subset of electrical loads.

6. The power distribution node of claim 1, wherein the microgenerator is configured to supply at least a portion of an inrush current drawn by the at least the subset of electrical loads.

7. The power distribution node of claim 1, wherein the distribution unit is a solid state switching device.

8. The power distribution node of claim 1, further including a power converter module configured to convert a first power received from at least one of the microgenerator or the power supply bus to a second power supplied to the subset of electrical loads.

9. The power distribution node of claim 1, further comprising a power converter having a first input connected with at least the power supply bus to receive power therefrom, a second input connected with the microgenerator to selectively receive power therefrom, and a first output connected with the subset of electrical loads,
   wherein the power converter is configured to convert one of a first power received from one of the first input and the second input to a second power different from the first power to be selectively provided to energize the at least the subset of electrical loads.

10. The power distribution node of claim 1, wherein the microgenerator is adapted for power generation based on a locally available energy source, relative to the power distribution node.

11. A power architecture for sets of electrical loads, comprising:
    a power distribution bus; and
    a set of power distribution nodes disposed between the power distribution bus and corresponding sets of electrical loads, each power distribution node including:
      a respective microgenerator comprising at least one of a photovoltaic panel, a turbine, a thermal energy harvester, a fuel cell, or a supplemental generator, the respective microgenerator configured to generate a supply of electrical power; and
      a respective distribution unit associated with the respective microgenerator connected with the power distribution bus to receive power therefrom, and further connected with the respective microgenerator to receive power therefrom, the distribution unit configured to selectively energize at least a subset of the corresponding electrical loads and further configured to selectively provide power from the respective microgenerator to the power distribution bus;
      a respective controller module configured to control the selective energizing of the at least a subset of the corresponding electrical loads by way of the respective distribution unit, based on available supplies of electrical power and a criticality of the at least the subset of the electrical loads;
    wherein energizing power is distributed among the set of power distribution nodes, and selectively supplied by at least one of the power distribution bus and the respective microgenerator in at least a subset of power distribution nodes, and wherein each power distribution node is disposed proximate to a corresponding set of electrical loads.

12. The power architecture of claim 11, wherein at least a subset of the power distribution nodes include corresponding power converters having a first input/output connected with at least the power distribution bus, a second input/output connected with at least one of the corresponding power storage device or the respective microgenerator, and a first output connected with the corresponding set of electrical loads, wherein the power converter is configured to convert a first power received from at least one of the first input/output or the second input/output to a second power supplied to the set of electrical loads.

13. The power architecture of claim 12, wherein the corresponding power converters are further configured to convert a third power received from the second input/output to a fourth power supplied to the first input/output to supplement the power distribution bus.

14. The power architecture of claim 13, wherein at least a subset of the power distribution nodes include a power storage device.

15. The power distribution node of claim 11, wherein the respective microgenerator is adapted for power generation based on a locally available energy source, relative to the power distribution node.

16. A method of providing a supplemental supply of electrical power in an aircraft, the method comprising:
    disposing a set of power distribution nodes about an electrical power architecture having a common power distribution bus, each power distribution node disposed proximate to a corresponding set of electrical loads wherein each power distribution node comprises a respective distribution unit associated with a respective microgenerator connected with at least one of an associated power storage device at the power distribution node to selectively receive power therefrom or an associated microgenerator at the power distribution node to selectively receive power therefrom, the at least one of the power storage device or the respective microgenerator configured to supply a transient power supply, wherein the respective microgenerator comprises at least one of a photovoltaic panel, a turbine, a thermal energy harvester, a fuel cell, or a supplemental generator, the power distribution node configured to selectively energize at least a subset of electrical loads disposed proximately to the power distribution node from the power distribution bus and the microgenerator and further configured to selectively provide power from the respective microgenerator to the power distribution bus; and in response to receiving in a controller module a supplemental power demand for the power distribution bus, controllably supplying via the distribution unit, a supplemental power supply from at least a subset of the power storage devices or at least a subset of the microgenerators to the power distribution bus based on available supplies of electrical power and a criticality of the at least the subset of the electrical loads.

17. The method of claim 16, wherein the disposing further includes configuring the at least one of the power storage device or the respective microgenerator to supply a transient power supply sized to supply at least a portion of transient power demands for the corresponding set of electrical loads.

18. The method of claim 16, wherein the controllably supplying includes controllably supplying a collective supplemental power supply from the at least the subset of the power storage devices configured for starting an engine, starting an auxiliary power unit, or for powering an emergency power distribution bus.

* * * * *